US009537928B2

(12) United States Patent
Tang (10) Patent No.: US 9,537,928 B2
(45) Date of Patent: Jan. 3, 2017

(54) REMOTE COMPUTING DEVICE USE OF UNSUPPORTED LOCAL COMPUTING DEVICE COMPONENTS

(71) Applicant: LiveCirrus Inc., Quincy, MA (US)

(72) Inventor: Lida Tang, Somerville, MA (US)

(73) Assignee: AlwaysOn Technologies, Inc., Quincy, MA (US)

( * ) Notice: Subject to any disclaimer, the term of this patent is extended or adjusted under 35 U.S.C. 154(b) by 254 days.

(21) Appl. No.: 13/798,345

(22) Filed: Mar. 13, 2013

(65) Prior Publication Data

US 2014/0053076 A1    Feb. 20, 2014

Related U.S. Application Data

(60) Provisional application No. 61/684,073, filed on Aug. 16, 2012.

(51) Int. Cl.
*H04L 29/08* (2006.01)
*G06F 17/30* (2006.01)

(52) U.S. Cl.
CPC ....... *H04L 67/025* (2013.01); *G06F 17/30879* (2013.01)

(58) Field of Classification Search
CPC . G06F 3/0481; G06F 17/30879; G06F 9/4445
See application file for complete search history.

(56) References Cited

U.S. PATENT DOCUMENTS

| 6,718,337 | B1* | 4/2004 | Klein ................ G06F 17/30879 |
| 7,783,702 | B2 | 8/2010 | Liu |
| 2008/0228865 | A1 | 9/2008 | Cruzada |
| 2008/0307096 | A1 | 12/2008 | Wang |
| 2010/0077323 | A1* | 3/2010 | Hunter .......................... 715/760 |
| 2010/0269152 | A1* | 10/2010 | Pahlavan et al. ................. 726/3 |
| 2011/0145863 | A1* | 6/2011 | Alsina ................... G06F 9/4445 |
| | | | 725/44 |
| 2011/0154507 | A1* | 6/2011 | King et al. ...................... 726/28 |

* cited by examiner

*Primary Examiner* — Matt Kim
*Assistant Examiner* — David Luu
(74) *Attorney, Agent, or Firm* — Robert Plotkin, P.C.; Robert Plotkin, Esq.

(57) ABSTRACT

A local computing device is connected to a remote computing device over a network. A user provides input to a local input component of the local computing device. The output of the local input component is converted into a form that is capable of being received as input by the remote computing device even if the local input component is not supported by the remote computing device. As one example, the local input component may be a bar code scanner which produces bar code output that is converted into text for input into a text field on the remote computing device, thereby enabling the remote computing device to receive input from a bar code scanner even if the remote computing device does not support the bar code scanner.

28 Claims, 4 Drawing Sheets

REMOTE COMPUTING DEVICE USE OF UNSUPPORTED LOCAL COMPUTING DEVICE COMPONENTS

CROSS-REFERENCE TO RELATED APPLICATIONS

This application claims priority from U.S. Prov. Pat. App. Ser. No. 61/684,073, filed on Aug. 16, 2012, entitled, "Remote Use of Local Computing Components," which is hereby incorporated by reference herein.

BACKGROUND

Various systems exist for using a mobile computing device to browse the World Wide Web using web browser software that executes on the mobile computing device. For example, a version of the Safari web browser that is designed for use on the Apple iPhone may be used to browse the web using an iPhone. One of the reasons that mobile computing devices, especially handheld computing devices, typically browse the web using web browsers that have been designed specifically for use on mobile computing devices is so that the browser may interact accurately and efficiently with the particular input and output devices (such as a touchscreen and/or limited keyboard) that are embedded within and/or locally attached to the mobile computing device.

One problem with using web browser software that executes on a mobile computing device is that such software typically does not include all of the features that are included in web browser software that executes on a desktop computer, laptop computer, or other more power, non-mobile, computer. For example, the version of the Safari web browser that executes on desktop computers is capable of displaying multimedia content (such as YouTube videos) using Adobe Flash technology, whereas the versions of the Safari web browser that execute on the iPad, iPhone, and other iOS devices are not capable of displaying multimedia content using Adobe Flash technology. As a result, users of mobile devices cannot use the Safari web browser to view and interact with multimedia content using Adobe Flash technology, despite the popularity of such content and the desirability of providing users with the ability to interact with such content.

One solution to this problem is to provide the mobile computing device with special-purpose applications (sometimes referred to as "apps"), such as a YouTube application, that is capable of rendering multimedia content using Adobe Flash technology or otherwise providing an equivalent experience to the user. Although such solutions may enable the user to interact with the desired multimedia content, one drawback of such solutions is that they impose additional burdens on end users by requiring them to install, maintain, and use multiple applications to interact with a variety of content, instead of using a single web browser to interact with all such content.

One solution to the problem described above is to provide the mobile computing device with remote desktop software, such as the GoToMyPC software available from Citrix Systems. In this scenario, the user of the mobile computing device installs GoToMyPC software on the user's personal desktop computer. The user also installs GoToMyPC software on the user's mobile computing device. The user then executes the GoToMyPC software on the user's mobile computing device to access the user's personal desktop computer over the Internet. The GoToMyPC software displays the contents of the user's personal desktop computer screen on the screen of the user's mobile computing device. Furthermore, the GoToMyPC software transmits any input (such as keyboard input) received by the mobile device from the user to the user's personal desktop computer. In this way, the GoToMyPC software enables the user to use the mobile device to remotely control the user's personal desktop computer.

Using such a system, the user can use the mobile device to cause the user's personal desktop computer to execute the desktop version of a web browser such as Safari and to display multimedia content, such as YouTube videos, using Adobe Flash technology. The GoToMyPC software transmits the results of rendering the multimedia content to the mobile computing device and produces output representing the multimedia content, such as in the form of video and/or audio, on the mobile computing device. Such a system, therefore, provides the user with the experience of interacting with multimedia content on the mobile computing device even though the mobile computing device itself is not capable of executing the Adobe Flash software and/or other software that is necessary to render such content directly on the mobile computing device.

Using remote desktop software, such as GoToMyPC, to enable a mobile computing device to render multimedia content remotely via a desktop computer presents a variety of disadvantages. For example, the mobile computing device may include or otherwise be connected to local input components and/or output components ("I/O components") that are not contained within or otherwise locally connected to the remote desktop computer. Such differences in the I/O components that are connected to the mobile computing device and the remote desktop computer may prevent the user from using certain I/O components of the mobile computing device or cause such I/O components to produce undesirable results when used in connection with the remote desktop computing via the remote desktop software.

What is needed, therefore, are improved techniques for enabling mobile computing devices to use resources of remote computers over a network.

SUMMARY

A local computing device is connected to a remote computing device over a network. A user provides input to a local input component of the local computing device. The output of the local input component is converted into a form that is capable of being received as input by the remote computing device even if the local input component is not supported by the remote computing device. As one example, the local input component may be a bar code scanner which produces bar code output that is converted into text for input into a text field on the remote computing device, thereby enabling the remote computing device to receive input from a bar code scanner even if the remote computing device does not support the bar code scanner.

For example, one aspect of the present invention is directed to a computer-implemented method comprising: (1) receiving first output from a local input component of a local computing device, wherein the first output is of a first source output type; (2) determining that an element of a remote computing device is in a state in which the element is capable of receiving input of a first target output type; and (3) converting the first output into second output of the first target output type; wherein the remote computing device does not support the local input component of the local computing device.

Other features and advantages of various aspects and embodiments of the present invention will become apparent from the following description and from the claims.

DETAILED DESCRIPTION

As mentioned above, a variety of disadvantages are associated with using conventional remote desktop software on a mobile computing device to remotely control software executing on a desktop computer. One such disadvantage is that the software that executes on the desktop computer typically is software that was designed to execute on a desktop computer, not on a mobile computing device. As a result, features of the software executing on the remote desktop computer may be unsuitable or suboptimal for interaction with the local mobile computing device. For example, if a user uses conventional remote desktop software executing on an Apple iPad to remotely control the desktop version of Apple's Safari web browser on a remote Apple iMac desktop computer, the version of the Safari web browser that is executing on the remote Apple iMac computer is the desktop version of such software, which was designed to interact with the I/O components of a desktop computer, such as a full-sized physical (hard) keyboard, mouse, and full-sized monitor, not with the I/O components of an iPad, such as a small touchscreen. For example, the desktop version of the Safari web browser is not designed to receive input from a bar code scanner or camera or to provide output to the relatively small screen of an iPad.

As a result, the user of the mobile computing device (e.g., iPad) is unable to provide input to the remote desktop computer using the full set of the mobile computing device's input components when using conventional remote desktop software. Instead, remote desktop software typically limits the user of the mobile computing device to using one or a small number of predefined input components, which are preconfigured to operate in a particular way. For example, the remote desktop software may enable the mobile computing device to use its physical keyboard and/or virtual keyboard to provide emulated keyboard input to the remote desktop computer. As another example, the remote desktop software may simply shrink the visual output of the remote desktop computer by some percentage for display on the smaller screen of the mobile computing device.

Even when it is possible to provide input to the remote desktop computer using the mobile computing device's input components, doing so may be cumbersome, as in the case of using the mobile computing device's touch screen to provide emulated mouse input to the remote desktop computer. Similarly, the user of the mobile computing device is unable to receive output that is capable of being output by the full set of the mobile computing device's output components when using conventional remote desktop software. Even when it is possible to receive output that the mobile computing device's output components are capable of outputting, the resulting output produced by the mobile computing device may be suboptimal, as in the case of a web page that was rendered by the remote desktop computer for display on a large monitor, and which is then displayed at a significantly reduced size on the iPad's much smaller touchscreen.

Furthermore, when using conventional remote desktop software, the remote desktop computer's operating systems and applications cannot discover the particular I/O components of the mobile computing device. For example, the remote desktop computer cannot query the mobile computing device to discover that the mobile computing device contains a bar code scanner, or that a bar code scanner was recently connected to the mobile computing device, and the mobile computing device cannot push this information to the remote desktop computer. Instead, the remote desktop computer is limited to interacting with those I/O components of the local mobile computing device that the remote desktop software presents to the remote desktop computer. If the remote desktop software is not capable of or configured to provide input to the remote desktop computer from particular input components of the local mobile computing device, such as bar scanners or cameras, then it is not possible to provide input to the remote desktop computer based on the output of such input components of the local mobile computing device.

In other words, the remote desktop computer is limited to interacting with the predetermined virtual I/O components of the mobile computing device that the remote desktop software presents to the remote desktop computer. Such virtual I/O components may not reflect the full set of I/O features of the actual I/O components of the mobile computing device, and it may not be possible to change (e.g., add or remote) components from the set of virtual I/O components presented to the remote desktop computer in response to changes (e.g., addition or removal) in the physical I/O components that are connected to the local mobile computing device.

Furthermore, the software that executes on the desktop computer (such as its operating system and/or software applications, such as web browsers) may not be designed to accept input from certain particular input components or types of input components that are connected locally to the mobile computing device, such as the mobile computing device's camera or bar code scanner. As a result, when using conventional remote desktop software, it may not be possible to provide input received using such input components of the local mobile computing device to software executing on the remote desktop computer.

In contrast, embodiments of the present invention are directed to techniques for receiving input from an input component, such as a bar code scanner, that is contained within or otherwise locally connected to a computing device, and for providing output produced by such an input component over a network to a remote computing device, even if the remote computing device is not locally connected to the input component or any input component of the same type as the input component, and even if the remote computing device does not contain any means (e.g., hardware and/or software) for receiving input via the input component or any input component of the same type as the input component.

Consider, for example, a situation in which the remote computing device is a desktop computer that executes a desktop web browser, such as the desktop version of the Apple Safari web browser. Such a web browser may not be designed to accept input from a bar code scanner. For example, such a web browser may not include any components that are capable of receiving input from a bar code scanner, and/or any components that are capable of interpreting input from a bar code scanner. Furthermore, the remote computing device on which the desktop web browser executes may lack any means (e.g., a suitable device driver) for receiving input from and/or interpreting input from a bar code scanner. Embodiments of the present invention may be used to enable a user of a local computing device (such as a smartphone, tablet computer, or other mobile computing device) to remotely control software, such as a desktop web browser, that executes on the remote computing device. If the user uses the local computing device to navigate to a web page that contains a text input field (such as a product search field on the web page of an online retailer, such as Amazon.com), embodiments of the present invention may detect that the user has navigated to a web page that contains such a text input field.

The user may use a bar code scanner on the local computing device to scan a bar code from a product package. An embodiment of the present invention may receive output from the bar code scanner (e.g., data representing the scanned bar code) and convert that data into a form, such as text, that is suitable for being input into the text field in the web page that is currently displayed by the remote web browser software. An embodiment of the present invention may then input the converted text into the text field in the web page.

In this way, embodiments of the present invention may enable the user to use a bar code scanner on a local computing device to provide input into a web page that is displayed by a web browser executed by a remote computing device, even though the remote computing device is not designed to receive bar code input (e.g., even though the remote computing device lacks a bar code scanner device driver) and even though the web page is not designed to receive bar code input, without requiring modifications to be made to the remote computing device or to the web page. More generally, embodiments of the present invention may handle all receipt of input from the bar code scanner and all conversion of input from the bar code scanner into text form so that the text may be provided to the remote computing device and to the web page in the format that they expect.

Even more generally, embodiments of the present invention enable the user to take advantage of input devices, such as bar code scanners, that are present on or otherwise connected to the user's local computing device, even when the user is interacting with a remote computing device that lacks such input devices and that lacks the ability to interact with such input devices directly.

Figure 1A:
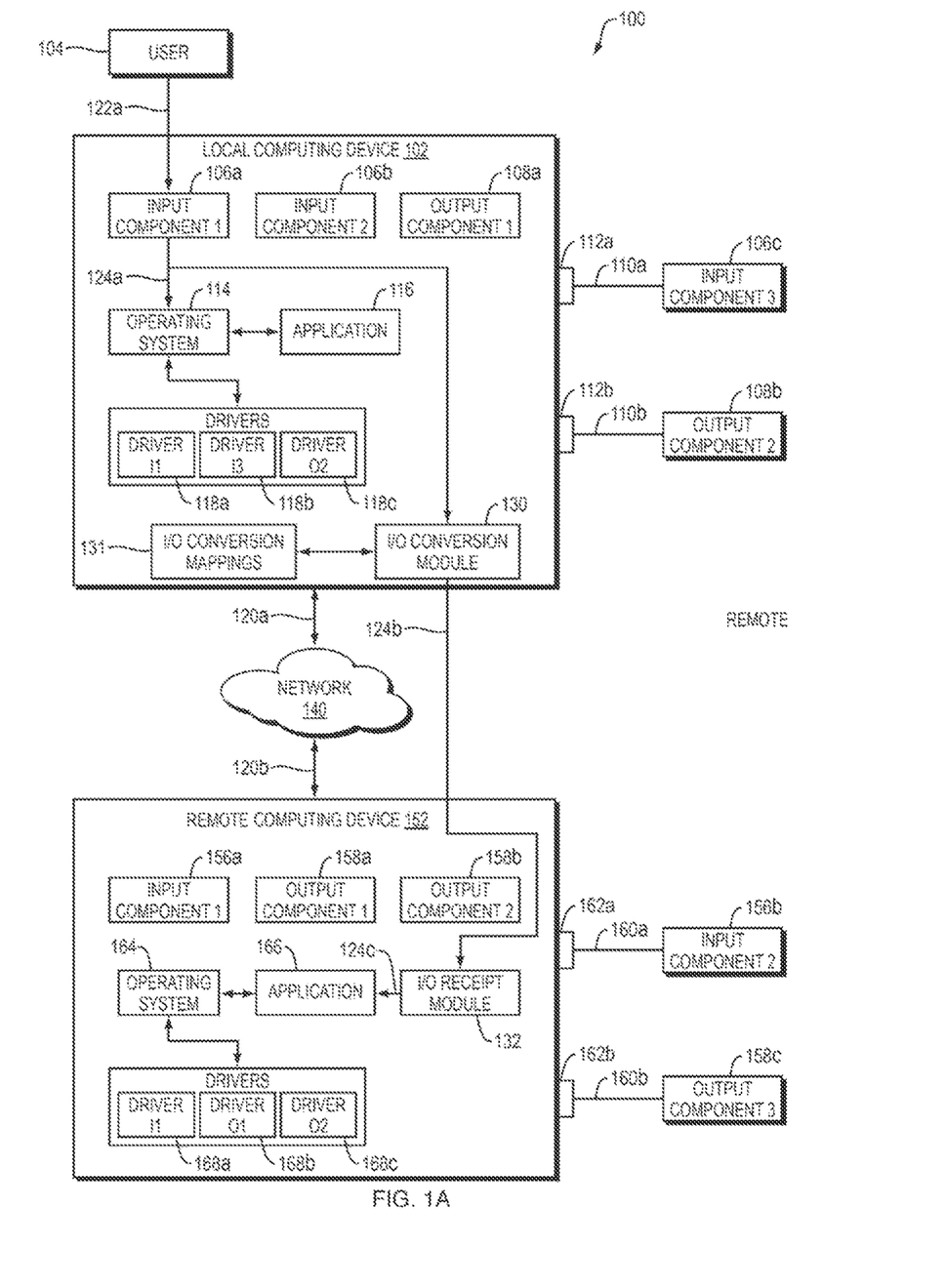
FIG. 1A is a dataflow diagram of a system for converting output from a local input component of a local input device into input to a local input component of a remote computing device according to one embodiment of the present invention.
Figure 2A:
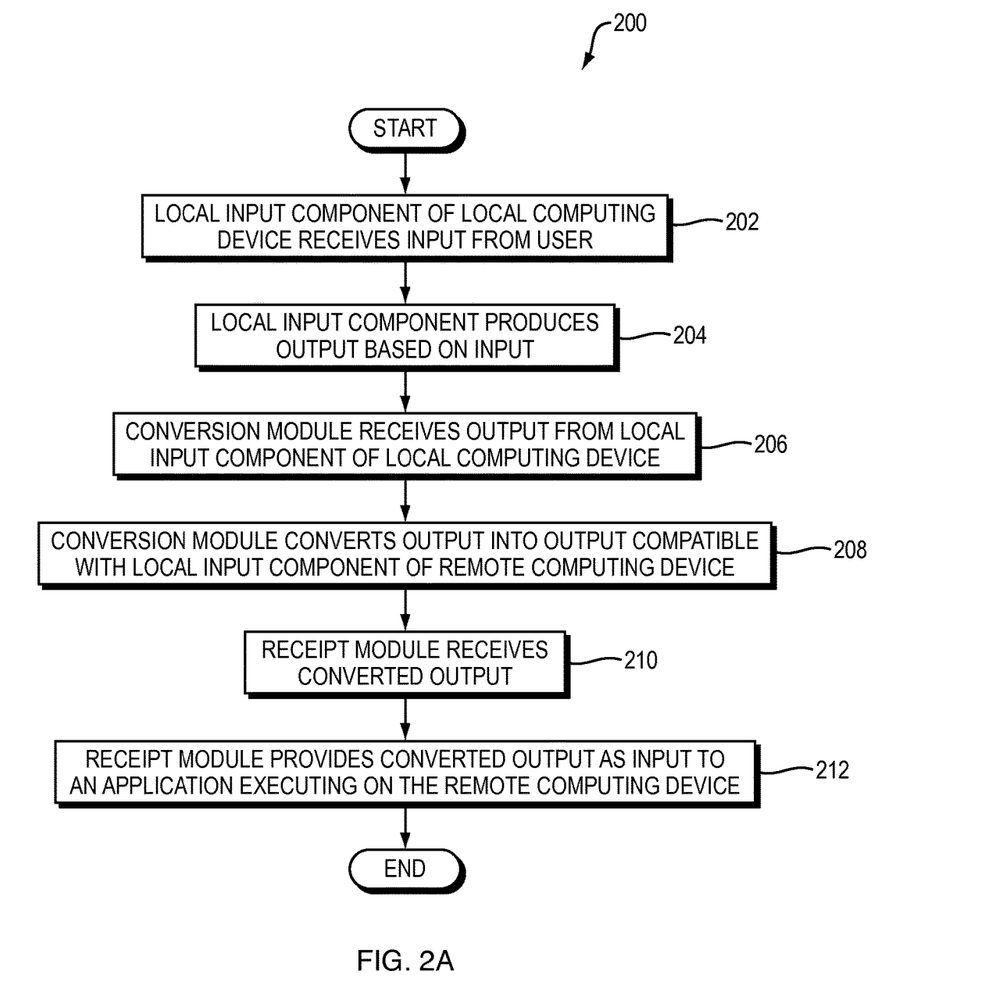
FIG. 2A is a flowchart of a method performed by the system of FIG. 1A according to one embodiment of the present invention.

Having generally described certain aspects of embodiments of the present invention, certain features and benefits of embodiments of the present invention will now be described in more detail. For example, referring to FIG. 1A, a dataflow diagram is shown of a system 100 implemented according to one embodiment of the present invention. Referring to FIG. 2A, a flowchart is shown of a method 200 performed by the system 100 according to one embodiment of the present invention.

The system 100 includes a local computing device 102 and a remote computing device 152. Although only one local computing device 102 and one remote computing device 152 are shown in FIG. 1A for purposes of example, embodiments of the present invention may be used in connection with systems including any number of local computing devices and any number of remote computing devices.

The term "I/O component" refers herein generally to any component that receives input and/or provides output. For example, input components such as keyboards and mice are examples of I/O components. Similarly, output components such as monitors and printers are examples of I/O components. Similarly, components that are capable both of receiving input and providing output, such as touchscreens, are examples of I/O components.

The term "local computing device" refers herein to a computing device that receives local input from and/or provides local output to a user 104. The term "local input" refers herein to input received via one or more local input devices. The term "local output" refers herein to output provided via one or more local output devices. A particular I/O component is referred to herein as a "local I/O component" in relation to a particular computing device if the I/O component is contained within or otherwise connected to the computing device by a direct cable connection (e.g., a USB, FireWire, or Thunderbolt cable that connects to a compatible port of the local computing device) or a direct wireless connection, i.e., without the use of a switch, router or hub. A local I/O device communicates with its connected computing device using local communication protocols, such as local serial or parallel communication protocols, and not using network communication protocols such as the Internet Protocol (IP). As a result, a local computing device must include means, such as a suitable device driver, for receiving local input from a local input device and/or providing local output to a local output device.

Any reference herein to an I/O component that is "connected locally" to a computing device, or to an I/O component "of" a computing device, or to "the computing device's local I/O components," should be understood to refer to local I/O components of the computing device, as that term is defined above. Similarly, references herein to "a user's local computing device" should be understood to a computing device through which the user provides local input and/or from which the user receives local output.

The term "local" refers herein to a relationship among a particular user, a particular computing device, and a particular I/O component at a particular time. For example, a user may provide local input to a particular computing device at one time and subsequently (i.e., at a different time) log in to the same computing device remotely and then provide input remotely to the computing device. As another example, one user may provide local input to a computing device while another user receives remote output from the same computing device at the same time.

Returning to the example system 100 of FIG. 1A, the local computing device 102 includes (i.e., contains) two input components 106*a-b* and one output component 108*a*. The components 106*a-b* and 108*a* may, for example, be contained within a housing of the computing device 102 and be coupled to an internal I/O bus of the computing device 102. Although two internal input components 106*a-b* and one internal output component 108*a* are shown in FIG. 1A for purposes of example, the local computing device 102 may contain any number of internal input components (including zero) and any number of internal output components (including zero). Furthermore, the local computing device 102 may include components that are capable both of receiving input and of producing output (as in the case of a touchscreen).

In the example system 100 of FIG. 1A, the local computing device 102 is connected to an external input component 106c and an external output component 108b. The components 106c and 108b may, for example, be connected to ports 112a and 112b, respectively, of the local computing device 102. Either or both of ports 112a and 112b may be physical (hard) ports or virtual (soft) ports. The components 106c and 108b may, for example, be connected to the local computing device 102 via connections 110a-b, which may, for example, be wired connections (e.g., USB cables) or wireless connections. Although one external input component 106c and one external output component 108b are shown in FIG. 1A for purposes of example, the local computing device 102 may be connected to any number of external input components (including zero) and any number of external output components (including zero).

The local computing device 102 may include any operating system 114. If the local computing device 102 is a mobile computing device, then the operating system 114 may be an operating system that is specifically designed and configured to execute on a mobile computing device, such as the Apple iOS operating system. The operating system 114 may, however, be any operating system, including an operating system that is designed and configured to execute on desktop computers, such as the Apple Mac OS X operating system.

The local computing device 102 may include one or more software applications 116. For ease of illustration, only one software application 116 is shown in FIG. 1A. The software application 116 may be any computer program that is executable by the operating system 114, such as a web browser, database application, word processing application, spreadsheet application, presentation application, or messaging application (e.g., email client or text messaging client).

The local computing device 102 may include one or more device drivers 118a-c. Although three device drivers 118a-c are shown in FIG. 1A for purposes of example, the local computing device 102 may include any number of device drivers. In general, each of the device drivers 118a-c contains means for enabling the operating system 114, and hence the local computing device 102, to communicate locally with (i.e., receive input from and/or provide output to) a particular I/O component or particular type of I/O component. For purposes of example in the following description, assume that:

driver 118a enables the local computing device 102 to communicate locally with input component 106a;
driver 118b enables the local computing device 102 to communicate locally with input component 106c; and
driver 118c enables the local computing device 102 to communicate locally with output component 108b.

The local computing device 102 may not require a device driver to communicate with certain I/O components or certain types of I/O components. For example, in the system 100 of FIG. 1A, the local computing device 102 is capable of communicating with input component 106b and output component 108a without the use of a device driver. For example, the operating system 114 may inherently be capable of (i.e., include means for) communicating with input component 106b and output component 108a.

The system 100 of FIG. 1A also includes a remote computing device 152 that is connected to the local computing device 102 over a network 140, such as the public Internet or a local intranet. The term "remote" refers herein to a relationship between two computing devices at a particular time. For example, the remote computing device 152 is "remote" in relation to the local computing device 102 during such time as the remote computing device 152 is connected to the local computing device 102 over the network 140. The connection between the local computing device 102 and the remote computing device 152 over the network 140 may be any kind of connection except one that consists solely of a direct wired or wireless connection. For the connection between the local computing device 102 and the remote computing device 152 to be a "remote" connection, in other words, said connection must include at least one hardware networking infrastructure element, such as at least one router, switch, or gateway, and the local computing device 102 must communicate with the remote computing device 152 via a network protocol, such as the Internet Protocol (IP).

The remote computing device 152 includes (i.e., contains) one input component 156a and two output components 158a-b. The components 156a and 158a-b may, for example, be contained within a housing of the computing device 152 and be coupled to an internal I/O bus of the computing device 152. Although one internal input component 156a and two internal output component 158a-b are shown in FIG. 1A for purposes of example, the remote computing device 152 may contain any number of internal input components (including zero) and any number of internal output components (including zero). Furthermore, the remote computing device 152 may include components that are capable both of receiving input and of producing output (as in the case of a touchscreen).

In the example system 100 of FIG. 1A, the remote computing device 152 is connected to an external input component 156b and an external output component 158c. The components 156b and 158c may, for example, be connected to ports 162a and 162b, respectively, of the remote computing device 152. Either or both of ports 162a and 162b may be physical (hard) ports or virtual (soft) ports. The components 156b and 158c may, for example, be connected to the remote computing device 152 via connections 160a-b, which may, for example, be wired connections (e.g., USB cables) or wireless connections. Although one external input component 156b and one external output component 158c are shown in FIG. 1A for purposes of example, the remote computing device 152 may be connected to any number of external input components (including zero) and any number of external output components (including zero).

The remote computing device 152 may include any operating system 164. If the remote computing device 152 is a desktop computer, then the operating system 164 may be an operating system that is specifically designed and configured to execute on a desktop computer, such as the Apple Mac OS X operating system.

The remote computing device 152 may include one or more software applications 166. For ease of illustration, only one software application 166 is shown in FIG. 1A. The software application 166 may be any computer program that is executable by the operating system 164, such as a web browser, database application, word processing application, spreadsheet application, presentation application, or messaging application (e.g., email client or text messaging client).

The remote computing device 152 may include one or more device drivers 168a-c. Although three device drivers 168a-c are shown in FIG. 1A for purposes of example, the remote computing device 152 may include any number of device drivers. In general, each of the device drivers 168*a-c* contains means for enabling the operating system 164, and hence the remote computing device 152, to communicate with (i.e., receive input from and/or provide output to) a particular I/O component or particular type of I/O component. For purposes of example in the following description, assume that:

driver 168*a* enables the remote computing device 152 to communicate with input component 156*a*;

driver 168*b* enables the remote computing device 152 to communicate with output component 158*a*; and driver 168*c* enables the remote computing device 152 to communicate with output component 158*b*.

The remote computing device 152 may not require a device driver to communicate with certain I/O components or certain types of I/O components. For example, in the system 100 of FIG. 1A, the remote computing device 152 is capable of communicating with input component 156*b* and output component 158*c* without the use of a device driver. For example, the operating system 164 may inherently be capable of communicating with input component 156*b* and output component 158*c*.

Although embodiments of the present invention may be used in connection with any combination of local and remote computing devices, I/O components, operating systems, software applications, device drivers, and other elements, such combinations include, by way of example, the following:

The local computing device 102 may be a mobile (e.g., handheld) computing device and the remote computing device 152 may be an immobile (e.g., desktop) computing device.

The local operating system 114 may be an operating system that is specifically designed to execute on a mobile computing device (such as the Apple iOS operating system) and the remote operating system 164 may be an operating system that is specifically designed to execute on a desktop computing device (such as the Apple Mac OS X operating system).

The local computing device 102 may be connected to the network 140 by a connection 120*a* that is a wireless (e.g., WiFi or cellular) connection, and the remote computing device 152 may be connected to the network 140 by a connection 120*b* that is a wired (e.g., Ethernet) connection.

The local computing device 102 may be locally connected to one or more I/O components that are not locally connected to the remote computing device 152. For example, in the system 100 of FIG. 1A, the input components 106*a-c* are locally connected to the local computing device 102 but not to the remote computing device 152. Similarly, the output components 108*a-b* are locally connected to the local computing device 102 but not to the remote computing device 152.

Furthermore, the local computing device 102 may be locally connected to one or more I/O components that are not supported by the remote computing device 152. A particular input component is said herein to be "supported by" a particular computing device if and only if the computing device contains means for receiving local input from the input component. Similarly, a particular output component is said herein to be "supported by" a particular computing device if and only if the computing device contains means for providing local output to the output component. For example, a particular I/O component is supported by a particular computing device if the computing device contains a device driver that is capable of communicating locally with the I/O component.

Conversely, a particular input component is said herein not to be supported by a particular computing device if the computing device does not contain any means for receiving local input from the input component. Similarly, a particular output component is said herein not to be supported by a particular computing device if the computing device does not contain any means for providing local output to the output component. For example, if a computing device does not contain a device driver or any other means for receiving local input from a particular input component, then the computing device does not support the input component.

Whether a particular I/O component is supported by a particular computing device may change over time. For example, an I/O component that is not supported by a computing device at one time may become supported by the computing device at a later time as a result of a device driver for that I/O component being installed on the computing device.

In certain embodiments of the present invention, the local computing device 102 is locally connected to at least one I/O component that is supported by the local computing device 102 and that is not supported by the remote computing device 152. For example, the input component 106*a* may be supported by the local computing device 102 but not by the remote computing device 152. This lack of support of the input component 106*a* may, for example, be the result of any one or more of the following:

the remote computing device 152 may lack the device driver 118*a* that is contained within the local computing device 102 for communicating with the input component 106*a*;

the remote computing device 152 may lack any device driver for communicating with the input component 106*a*;

the operating system 164 of the remote computing device 152 may lack support for the input component 106*a*;

the remote computing device 152 may lack an I/O port that is compatible with the input component 106*a*;

the remote computing device 152 may lack an I/O bus that is compatible with the input component 106*a*.

Although embodiments of the present invention may be used in connection with remote computing devices that lack support for any kind(s) of I/O components, as specific examples the remote computing device 152 may lack support for any one or more of the following: a camera that is locally connected to the local computing device 102, a microphone that is locally connected to the local computing device 102, a bar code scanner that is locally connected to the local computing device 102, a touchscreen that is locally connected to the local computing device 102, a keyboard (hard or soft) that is locally connected to the local computing device 102, a mouse that is locally connected to the local computing device 102, and a touchpad that is locally connected to the local computing device 102.

In general, embodiments of the present invention may be used to enable input provided by the user 104 to a local input component of the local computing device 102 to be used to generate input to the remote computing device 152, even if the local input component of the local computing device 102 is not supported by the remote computing device 152. For example, embodiments of the present invention may be used to enable input provided by the user 104 to a local input component of the local computing device 102 to be used to generate input to the remote computing device 152, even if the remote computing device 152 lacks a device driver for the local input component of the local computing device 102.

Embodiments of the present invention may, for example, convert the output of the local input component of the local computing device 102 into a form that is compatible with the output of a local input component of the remote computing device 152. Output is "compatible with" the output of an input component if the output is of the same type as that produced by the input component. For example, text is "compatible with" the output of a keyboard, an image is "compatible with" the output of a camera, and audio is "compatible with" the output of a microphone.

In particular, consider an example in which the output of the local input component of the local computing device 102 is non-textual output, as in the case of a bar code scanner or camera. Embodiments of the present invention may be used to convert such output into text, and to provide such text as input to the remote computing device 152. If the remote computing device 152 is locally connected to a keyboard or other input component capable of producing text as output, then the conversion of the non-text data into text produces data that is compatible with the output of the remote computing device's local keyboard. Such a conversion may be performed even if the input component that produced the non-textual output (e.g., the bar code scanner or camera) is not supported by the remote computing device 152.

Referring to FIG. 2A, in one embodiment of the present invention, input provided to a local input component of the local computing device 102 may be processed as follows. The user 104 provides input to a local input component of the local computing device 102 (FIG. 2A, operation 202). For example, referring to FIG. 1A, user 104 may provide input 122a to input component 106a. For example, if the input component 106a is a camera or bar code scanner, the input 122a may be light captured by the camera or bar code scanner. Although the input provided in operation 202 may be input provided to any local input component of the local computing device 102, the following description will refer to input 122a provided to input component 106a for purposes of example.

The local input component 106a produces output 124a based on the received input 122a (FIG. 2A, operation 204). The input component 106a may receive the input 122a and produce the output 124a under control of the operating system 114 and, if applicable, the corresponding device driver 118a. The output 124a may take any form. For example, if the input component 106a is a camera, the output 124a may be digital image data. As another example, if the input component 106a is a bar code scanner, the output 124a may be data representing the scanned bar code, e.g., as a sequence of bits or digits.

The local computing device 102 includes an I/O conversion module 130. Although the conversion module 130 is shown in FIG. 1A as being contained within the local computing device 102, this is merely an example and does not constitute a limitation of the present invention. Alternatively, for example, the conversion module may be contained within the remote computing device 152 or within one or more computing devices (not shown) other than the local computing device 102 and the remote computing device 152. As yet another example, the functions performed by the conversion module 130 may be distributed across the local computing device 102 and the remote computing device 152, or across the local computing device 102, remote computing device 152, and one or more additional computing devices (not shown).

The conversion module 130 receives the output 124a of the local computing device's local input component 106a as input (FIG. 2A, operation 206). The output 124a may be pushed to or pulled by the conversion module 130. The conversion module 130 may receive the output 124a either directly from the input component 106a in its raw form, or after the output 124a has been processed, e.g., by the operating system 114, device driver 118a, application 116, or any combination thereof.

The conversion module 130 converts the output 124a into output 124b that is compatible with output of a local input component of the remote computing device 152 (FIG. 2A, operation 208). For example, if the output 124a is a digital image, and one of the local input components of the remote computing device 152 is a keyboard, then the conversion module 130 may convert the output 124a into text data and produce the text data as output 124b.

The I/O conversion module 130 may be capable of converting output from each of the local input components 106a-c only into certain types of output. For example, the I/O conversion module 130 may be capable of converting:
  image output from the input component 106a into image data, text data, or a combination thereof;
  audio output from the input component 106b into audio data, image data, text data, or a combination thereof;
  text output from the input component 106c into text data, image data, audio data, or a combination thereof.

For ease of explanation, the type of output produced by the input components 106a-c will be referred to as the "source output type," while the type of the converted output 124b produced by the I/O conversion module 130 will be referred to as the "target output type." As these examples illustrate, the I/O conversion module 130 may be capable of converting output from different input components into different target output types. When the I/O conversion module 130 converts output from a particular one of the input components 106a-c, the I/O conversion module 130 may select the target output type in any of a variety of ways. For example, the I/O conversion module 130 may select the target output type to be a target output type that is compatible with the output of the remote computing device's local input component to which the target output is being sent.

The I/O conversion module 130 may store data 131 representing mappings between each source output type capable of being produced by each of the local input components 106a-c and the target output type into which that source output type is capable of being converted by the I/O conversion module. For example, the mapping data 131 may indicate that:
  the local input component 106a is capable of producing image output that the conversion module 130 is capable of converting into image data and text data;
  the local input component 106a is capable of producing bar code output that the conversion module 130 is capable of converting into text data;
  the input component 106b is capable of producing audio output that the conversion module 130 is capable of converting into audio data, image data, and text data; and
  the input component 106b is capable of producing audio data that the conversion module 130 is capable of converting into audio data, image data, and text data.

The conversion module 130 may use the mapping data 131 to determine which conversions of source output type into target output type may be performed for a particular local input component. Further description of the use of the mappings may be found below in connection with FIGS. 1B and 2B.

The remote computing device 152 includes an I/O receipt module 132. Although the receipt module 132 is shown in FIG. 1A as being contained within the remote computing device 152, this is merely an example and does not constitute a limitation of the present invention. Alternatively, for example, the receipt module 132 may be contained within one or more computing devices (not shown) other than the local computing device 102 and the remote computing device 152. As yet another example, the functions performed by the receipt module 132 may be distributed across the local computing device 102 and the remote computing device 152, or across the local computing device 102, remote computing device 152, and one or more additional computing devices (not shown).

The I/O receipt module 132 receives the converted output 124*b* (FIG. 2A, operation 210) and provides the converted output 124*b* as input to an application executing on the remote computing device 152, such as application 166 (FIG. 2A, operation 212). The receipt module 132 may further convert or otherwise process the output 124*b* to produce output 124*c*, and then provide output 124*c*, instead of output 124*b*, to the application 166. The receipt module 132 may, for example, provide the output 124*c* as input to a user interface element of the application 166, such as by inputting text into a text box of the application 166, checking a checkbox or radio button of the application 166, selecting a list element from a dropdown list of the application 166, selecting a file from a file chooser of the application 166, pressing a button of the application 166, or selecting a menu item from a menu of the application 166.

The techniques described above may be useful for enabling the remote computing device 152 to take advantage of the full range of I/O components 106*a-c* and 108*a-b* of the local computing device 102. Furthermore, certain embodiments of the present invention may be used to dynamically select local input devices of the local computing device 102 for use in providing input to the remote computing device 152, based on the state of the remote computing device 152. As the state of the remote computing device 152 changes, embodiments of the present invention may select different local input components of the local computing device to provide input to the remote computing device 152.

Figure 1B:
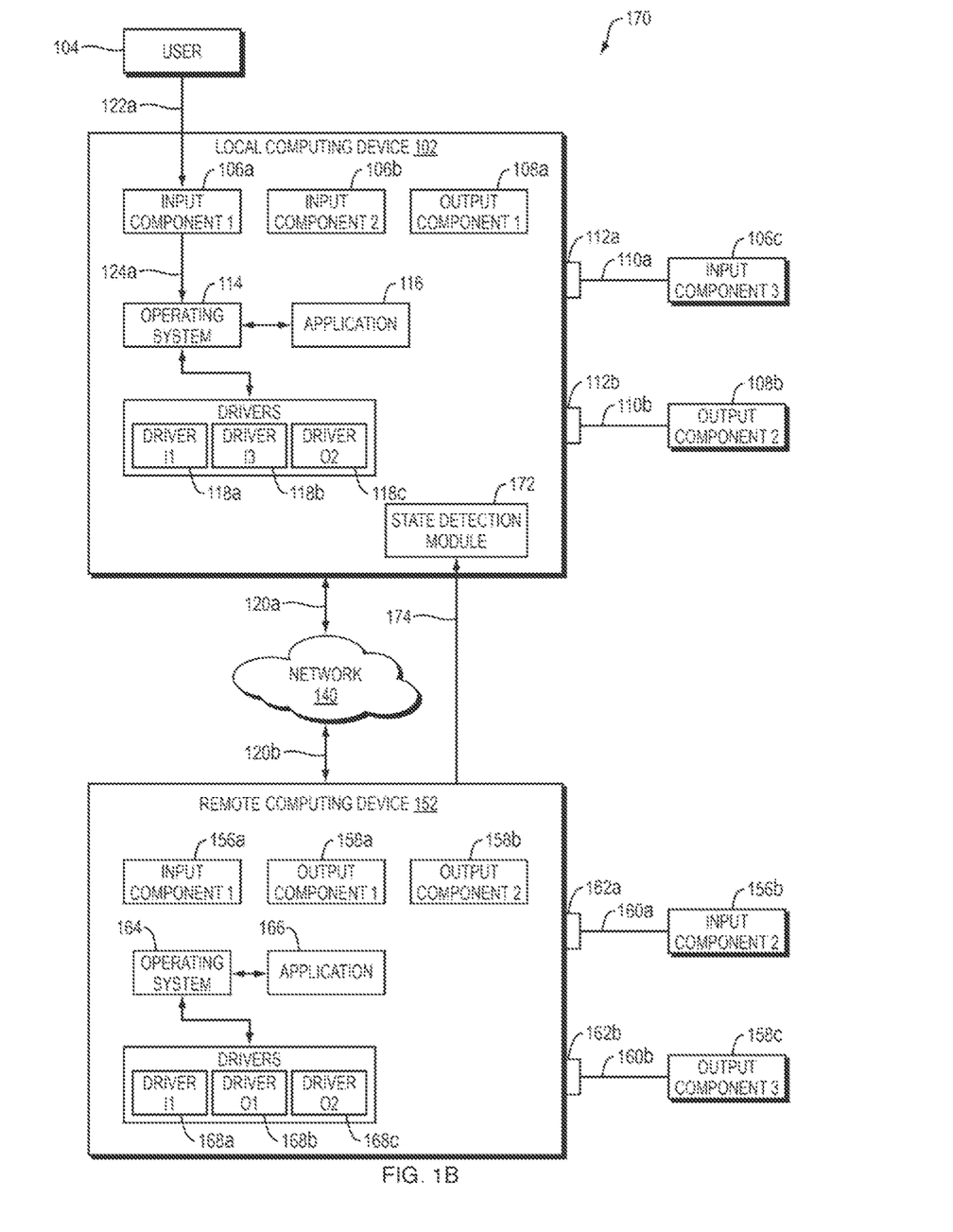
FIG. 1B is a dataflow diagram of a system for converting output from a local input component of a local input device into input to a local input component of a remote computing device based on a state of the remote computing device according to one embodiment of the present invention.
Figure 2B:
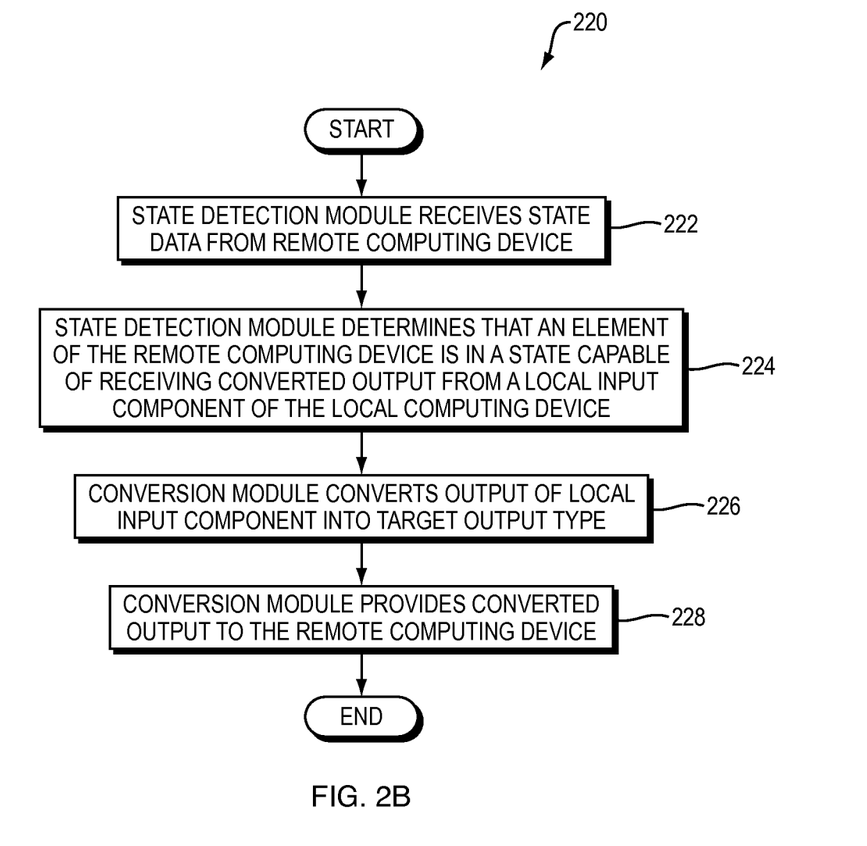
FIG. 2B is a flowchart of a method performed by the system of FIG. 1B according to one embodiment of the present invention.

More specifically, referring to FIG. 1B, a dataflow diagram is shown of a system 170 for dynamically selecting local input components of the local computing device 102 to provide input to the remote computing device 152 based on the state of the remote computing device 152 in one embodiment of the present invention. Referring to FIG. 2B, a flowchart is shown of a method 220 that is used by the system 170 of FIG. 1B according to one embodiment of the present invention.

In the system 170 of FIG. 1B, the local computing device 102 includes a remote computing device state detection module 172. Although the state detection module 174 is shown in FIG. 1B as being contained within the local computing device 102, this is merely an example and does not constitute a limitation of the present invention. Alternatively, for example, the state detection module 174 may be contained within the remote computing device 152 or within one or more computing devices (not shown) other than the local computing device 102 and the remote computing device 152. As yet another example, the functions performed by the state detection module 172 may be distributed across the local computing device 102 and the remote computing device 152, or across the local computing device 102, remote computing device 152, and one or more additional computing devices (not shown).

The state detection module 172 receives state data 174 representing a state of the remote computing device 152 (FIG. 2B, operation 222). The state data 174 may, for example, be pushed to or pulled by the state detection module 172. For example, the state data 174 may be pushed to or pulled by the state detection module 172 in response to an event, in response to input by the user 104, or periodically.

The state data 174 may represent a state of the remote computing device 152 as a whole or of any element(s) of the remote computing device 152. For example, the state data 174 may represent a state of an any one or more of the remote computing device's input components 156*a-b* and/or output components 158*a-c*. As another example, the state data 174 may represent a state of the operating system 164 executing on the remote computing device 152 or of an application executing on the remote computing device 152, such as the application 166. For example, the state data 174 may indicate whether the application 166 is executing, whether the application 166 is executing in the foreground, or whether a user interface element of the application 166 has an input focus (such as the keyboard focus or the pointer (e.g., mouse) focus).

As yet another example, the state data 174 may represent a state of any one or more user interface elements of the application 166. For example, the state data 174 may indicate whether any one or more user interface elements of the application 166 are in the foreground, currently have an input focus (such as the keyboard focus or the pointer (e.g., mouse) focus), or are otherwise currently capable of receiving input.

The state data 174 may include data indicating a type of input that is currently capable of being received by any one or more of the following "elements" of the remote computing device 152: the remote computing device 152 as a whole, the operating system 164, one or more applications executing on the remote computing device 152 (such as application 166), and one or more user interface elements of applications executing on the remote computing device 152. The state data 174 may indicate a correspondence between each such element and the type(s) of input that the element currently is capable of receiving. For example, the state data 174 may include data indicating that a particular text box of the application 166 currently is capable of receiving textual input, and that a particular window of the application 166 currently is capable of receiving pointer input.

The state detection module 172 determines, based on the state data 174, that an element of the remote computing device 152 is in a state in which the element is capable of receiving input of a type that matches a target output type of one of the local input components of the local computing device 102 (FIG. 2B, operation 224). For example, if a text box of the application 166 has the text cursor focus on the remote computing device 152, and a local input component of the local computing device 102 has a target output type of "text", this would trigger a match in operation 224 of FIG. 2B. As a particular example, if the input component 106*a* is a bar code scanner, and if the I/O conversion module 130 is capable of converting output of the bar code scanner into text output, then operation 224 of FIG. 2B may determine that the text box of the application 166 is in a state in which it is capable of receiving input of a type (i.e., text) that matches a target output type of the bar code scanner of the local computing device 102.

In response to the detection of operation 224, the I/O conversion module 130 converts output of the local input component that was identified in operation 224 into the target output type that was matched in operation 224 (FIG. 2B, operation 226). The I/O conversion module 130 then provides the converted output 124*b* to the remote computing device 152, as described above with respect to FIG. 2A (FIG. 2B, operation 228).

One particular use case of the system 170 and method 220 of FIGS. 1B and 2B involves the use of a local bar code scanner of the local computing device 102 to provide textual input into a text field of the application 166 executing on the remote computing device 152. In particular, assume that one of the local input components of the local computing device 102 (e.g., local input component 106*a*) is a bar code scanner, that the application 166 is a web browser, and that the user 104 has used the local computing device 102 to remotely control the web browser 166 to browse to an e-commerce web site, such as Amazon.com. Further assume that the web browser 166 is displaying a web page of Amazon.com that contains a text field into which a UPC code number may be typed to search for a product having that UPC code, and possibly that such a text field has the input focus. Further assume that the user 104 uses use the local bar code scanner of the local computing device 102 to scan a bar code from a product or product packaging. The techniques disclosed herein may be used to convert the output of the bar code scanner into text representing the same UPC code as the scanned bar code, and to input that text into the text field of the Amazon.com web page that is displayed by the remote web browser 166 of the remote computing device 152. In this way, the user 104 may use the local bar code scanner of the local computing device 102 to provide input into the remote web browser 166 even though neither the remote computing device 152, remote operating system 164, or remote application 166 are designed or configured to receive output from a bar code scanner.

Another particular use case of the system 170 and method 220 of FIGS. 1B and 2B involves the use of a local camera of the local computing device 102 to provide filename input into a file chooser user interface element of the application 166 executing on the remote computing device 152. In particular, assume that one of the local input components of the local computing device 102 (e.g., local input component 106*a*) is a camera, that the application 166 is an image management application, and that the user 104 has used the local computing device 102 to remotely control the image management application 166 to display a file chooser user interface element to select an image file to open. Further assume that the user 104 uses use the local camera of the local computing device 102 to capture a digital photograph. The techniques disclosed herein may be used to convert the output of the camera into text representing the filename of the captured digital photograph, and to input that text into the filename field of the file chooser. In this way, the user 104 may use the local camera of the local computing device 102 to provide input into the remote application 166 even if the remote computing device 152 does not have a locally connected camera, and even if the file chooser of the application 166 is not designed to receive image input.

Another particular use case of the system 170 and method 220 of FIGS. 1B and 2B involves the use of a local Global Positioning System (GPS) module of the local computing device 102 to provide zip (postal) code input into a text field of the application 166 executing on the remote computing device 152. In particular, assume that one of the local input components of the local computing device 102 (e.g., local input component 106*a*) is a GPS module, that the application 166 is a mapping application, and that the user 104 has used the local computing device 102 to remotely control the mapping application 166 to display a map with a text field for inputting a zip code. Further assume that the user 104 uses use the local GPS module of the local computing device 102 to identify the current location of the local computing device 102 and to produce output representing the zip code of the current location of the local computing device 102. The techniques disclosed herein may be used to convert the output of the GPS module into text representing the zip code of the current location of the local computing device 102, and to input that text into the zip code field of the mapping application 166. In this way, the user 104 may use the local GPS module of the local computing device 102 to provide input into the remote application 166 even if the remote computing device 152 does not have a locally connected GPS module, and even if the zip code field of the application 166 is not designed to receive output from a GPS module.

In some cases it may be desirable to enable the user of a particular local input component of the local computing device 102 to provide input only to certain elements of the remote computing device 152. For example, it may be desirable to enable a local bar code scanner of the local computing device 102 to provide input only to user interface elements (e.g., text fields) of the remote computing device 152 that are designed to receive UPC codes or other product descriptions as input. One way in which such a feature may be implemented is by supplementing the conversion mapping data 131 with data specifying the source output type(s) that are associated with a particular element of the remote computing device 152. For example, the mapping data 131 may indicate that a particular text field of the Amazon.com home page is associated with source output types of bar code and text, and with a target output type of text. As a result, the conversion module 130 may only enable local input components of the local computing device that produce source output types of bar code or text to be used to provide input to the particular text field of the Amazon.com home page. In this way, the user 104 may be prevented from using the local bar code scanner of the local computing device to provide textual input into text fields on the remote computing device 152 that are not designed to receive product descriptions as input.

Embodiments of the present invention have a variety of advantages, including the following. Embodiments of the present invention enable a remote computing device to receive input from local input components of a local computing device, even if the remote computer does not support those local input components in the absence of embodiments of the present invention. For example, embodiments of the present invention may be used to enable the remote computing device to receive input from input components that are not locally connected to the remote computing device, input components for which the appropriate software (e.g., device drivers) are not installed on the remote computing device, and input components from which software applications executing on the remote computing device are not designed to receive input (as in the case of text fields in a web browser, which are not designed to receive input from a bar code scanner).

One benefit provided to the end user by embodiments of the present invention is that the end user is able to make use of local input components in their normal, intended way to seamlessly provide input to the remote computer. Because any necessary conversion occurs automatically, the end user need not take any special action to enable local input components to be used to provide input to the remote computing device. Instead, the user may simply use the local input components in their normal way and let embodiments of the present invention perform any necessary data conversions and take any other actions necessary to enable the output of the local input components to be provided to the remote computing device.

Furthermore, because input components connected to a local computing device often are selected, designed, and/or configured to work particularly easily with the local computing device, embodiments of the present invention result in a more user-friendly experience than traditional remote desktop software. For example, a local tablet computer may lack a physical keyboard but contain a camera and bar code reader, while the remote computer may contain a physical keyboard but lack a camera and bar code reader. With traditional remote desktop software, the user cannot use the local camera or bar code reader as input components to the remote computer. Instead, conventional remote desktop software constrains the user to use input modalities that are supported by the remote computer, such as a keyboard. Since the tablet computer lacks a keyboard, the remote desktop software typically constrains the user to using a virtual (soft) keyboard, which is more difficult and slower to use than a physical keyboard. This results in a sub-optimal experience for the user.

The benefits described above may be obtained without requiring any modifications to the remote computing device, e.g., without installing new hardware on the remote computing device, without modifying the operating system of the remote computing device, without installing device drivers on the remote computing device, and without installing new software applications on the remote computing device. The same is true for the local computing device. As a result, embodiments of the present invention may be implemented more easily than solutions which require more extensive modifications to be made to the local and/or remote computing device.

In particular, embodiments of the present invention may be used in connection with existing hardware and software, such as existing web browsers (e.g., desktop versions Safari, Internet Explorer, Firefox). As a result, users who use embodiments of the present invention may continue to use their preferred operating systems and applications, instead of being limited to using special or modified versions of such applications with unusual or limited features. As a result, users may continue to take advantage of all of the features of such operating systems and applications, including future improvements to such operating systems and applications.

Embodiments of the present invention also expand the range of input options available to users. Users who use embodiments of the present invention may continue to use local input components in their traditional way, but also use such local input components to provide converted input to the remote computing device. For example, when a user uses the local computing device to navigate to a text field on the remote computing device, the user may either type text into the text field with a physical (hard) or virtual (soft) keyboard, or choose to provide input to the text field using a local bar code reader or GPS module of the local computing device. As this example illustrates, embodiments of the present invention may provide more than one local input component which is capable of providing input to a particular user interface component. The user may choose which of these local input components to use to provide input in any particular instance.

Embodiments of the present invention also retain all of the benefits of conventional remote desktop software, such as the ability to:
  enable a local computing device to leverage the more powerful processor(s) of the remote computing device to execute software more quickly than would be possible directly on the local computing device;
  execute software that cannot be executed by the hardware and/or operating system of the local computing device (e.g., a desktop web browser with Adobe Flash for rendering multimedia content);
  execute powerful software while reducing drain on the battery of the local computing device; and
  enable the local computing device to take advantage of a faster network connection of the remote computing device.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored in a non-transitory computer-readable medium, the method comprising:
    (1) receiving first output from a local input component of a local computing device, wherein the first output is of a first source output type;
    (2) determining that an element of a remote computing device is in a state in which the element is capable of receiving input of a first target output type, the element of the remote computing device comprising a text input field of a web page displayed by the remote computing device; and
    (3) in response to (2), converting the first output into second output of the first target output type;
    wherein the remote computing device does not support the local input component of the local computing device,
    wherein the element of the remote computing device does not support the first source output type, and
    wherein the first source output type comprises a bar code image, and wherein the first target output type comprises text for entry into the text input field of the webpage displayed by the remote computing device.

2. The method of claim 1, further comprising:
    (4) providing the second output to the remote computing device over a network.

3. The method of claim 1, wherein the element further comprises a checkbox.

4. The method of claim 1, wherein the element further comprises a radio button.

5. The method of claim 1, wherein the element further comprises a dropdown list.

6. The method of claim 1, wherein the element further comprises a file chooser.

7. The method of claim 1, wherein the local input component comprises a bar code scanner.

8. The method of claim 1, wherein the local input component comprises a camera.

9. The method of claim 1, wherein the remote computing device is not locally connected to an input component of the same type as the local input component of the local computing device.

10. The method of claim 1, wherein the remote computing device does not include a device driver capable of communicating with the local input component of the local computing device.

11. The method of claim 1, wherein the remote computing device does not include an operating system capable of communicating with the local input component of the local computing device.

12. The method of claim 1, wherein the remote computing device does not include an application capable of communicating with the local input component of the local computing device.

13. The method of claim 1, wherein (2) comprises determining that a user interface element capable of receiving input of the first target output type has an input focus.

14. The method of claim 1, wherein the first source output type comprises output of a camera, and wherein the first target output type comprises a text string.

15. The method of claim 1, wherein the first source output type comprises output of a bar code scanner, and wherein the first target output type comprises a text string.

16. A non-transitory computer-readable medium comprising computer program instructions executable by at least one computer process to perform a method, the method comprising:
    (1) receiving first output from a local input component of a local computing device, wherein the first output is of a first source output type;
    (2) determining that an element of a remote computing device is in a state in which the element is capable of receiving input of a first target output type, the element of the remote computing device comprising a text input field of a web page displayed by the remote computing device; and
    (3) in response to (2), converting the first output into second output of the first target output type;
    wherein the remote computing device does not support the local input component of the local computing device,
    wherein the element of the remote computing device does not support the first source output type,
    wherein the first source output type comprises a bar code image, and wherein the first target output type comprises text for entry into the text input field of the webpage displayed by the remote computing device.

17. The computer-readable medium of claim 16, wherein the method further comprises:
    (4) providing the second output to the remote computing device over a network.

18. The computer-readable medium of claim 16, wherein the element further comprises a checkbox.

19. The computer-readable medium of claim 16, wherein the element further comprises a radio button.

20. The computer-readable medium of claim 16, wherein the element further comprises a dropdown list.

21. The computer-readable medium of claim 16, wherein the element further comprises a file chooser.

22. The computer-readable medium of claim 16, wherein the local input component comprises a bar code scanner.

23. The computer-readable medium of claim 16, wherein the local input component comprises a camera.

24. The computer-readable medium of claim 16, wherein the remote computing device is not locally connected to an input component of the same type as the local input component of the local computing device.

25. The computer-readable medium of claim 16, wherein the remote computing device does not include a device driver capable of communicating with the local input component of the local computing device.

26. The computer-readable medium of claim 16, wherein the remote computing device does not include an operating system capable of communicating with the local input component of the local computing device.

27. The computer-readable medium of claim 16, wherein the remote computing device does not include an application capable of communicating with the local input component of the local computing device.

28. The computer-readable medium of claim 16, wherein (2) comprises determining that a user interface element capable of receiving input of the first target output type has an input focus.

* * * * *